United States Patent [19]

Ruger

[11] 4,274,293
[45] Jun. 23, 1981

[54] DRIVE BLOCK STRUCTURE FOR AN ADJUSTABLE VEHICLE SEAT TRACK

[75] Inventor: Dean L. Ruger, Manitou Beach, Mich.

[73] Assignee: International Telephone and Telegraph Corporation, New York, N.Y.

[21] Appl. No.: 41,650

[22] Filed: May 23, 1979

[51] Int. Cl.³ ............................................ F16H 29/20
[52] U.S. Cl. .............................. 74/89.15; 74/424.8 R; 248/429
[58] Field of Search ............... 248/429, 430, 424, 602; 74/89.15, 424.8 R

[56] References Cited

U.S. PATENT DOCUMENTS

| | | | |
|---|---|---|---|
| 2,919,744 | 1/1960 | Tanaka | 248/429 X |
| 2,929,439 | 3/1960 | Tanaka et al. | 74/424.8 R X |
| 3,043,552 | 7/1962 | Colautti | 248/429 |
| 3,951,004 | 4/1976 | Heesch | 74/89.15 |
| 4,015,812 | 4/1977 | Heesch | 248/394 |

Primary Examiner—C. J. Husar
Assistant Examiner—Conrad Berman
Attorney, Agent, or Firm—James B. Raden; Marvin M. Chaban

[57] ABSTRACT

The mechanism uses a drive block having mounting lugs on both transverse sides of the block for mounting in slots on opposed sides of a C-shaped bracket. The slots in the bracket are T-shaped, the body of the T accepting the mounting lugs for passage to the circular T head opening. By rotating the block 90°, the lugs rest in the circular opening and are held in place. Each lug has a necked down section passing through the slotted opening of the brackets. Each lug has an enlarged head extending outwardly of the bracket sides to prevent the bracket sides from spreading in response to shock forces acting on the seat track. The block has a central threaded opening to accept a lead screw for driving the seat track responsive to rotation of the lead screw. The bracket is secured to the seat track and the drive block is inserted into the bracket, rotated to position and mated with the lead screw.

8 Claims, 9 Drawing Figures

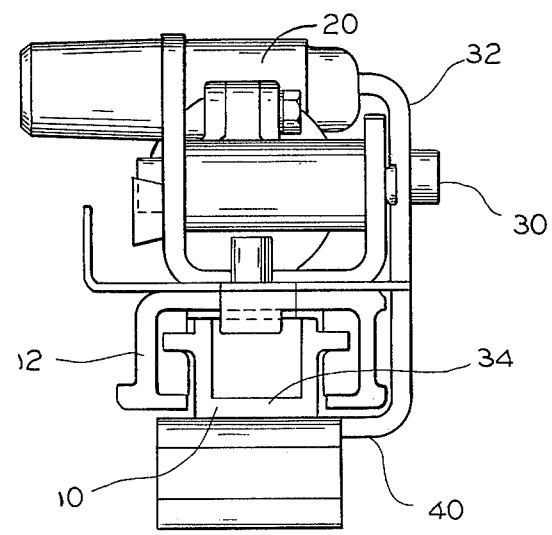
FIG. 3
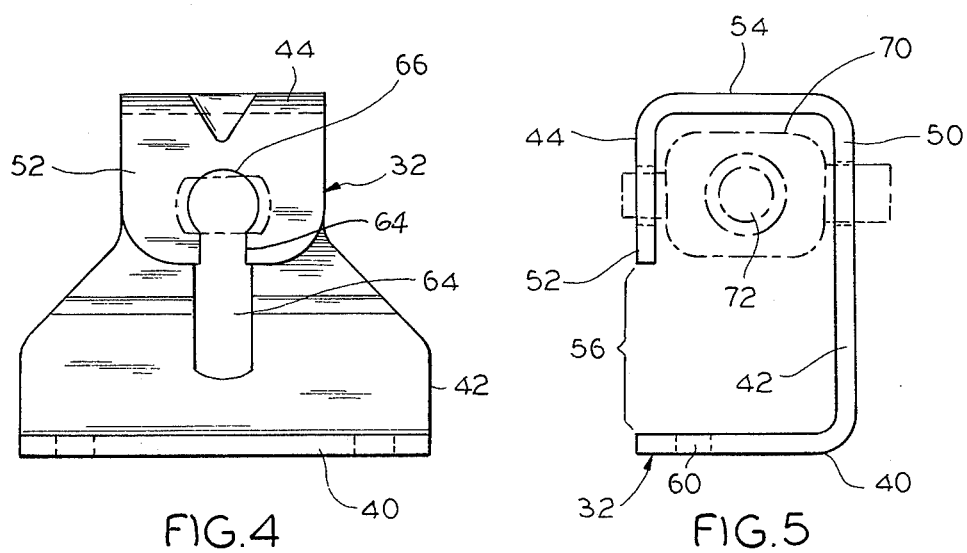
FIG. 4
FIG. 5
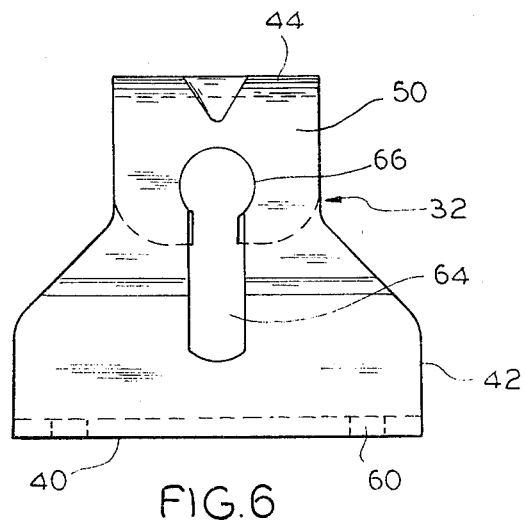
FIG. 6

DRIVE BLOCK STRUCTURE FOR AN ADJUSTABLE VEHICLE SEAT TRACK

BACKGROUND OF THE INVENTION

Automotive seat tracks which are adjustable four ways or six ways are very well-known and constitute a well-developed art. Adjustments may be manual or automatic (motor-driven) as shown by many patents such as U.S. Pat. No. 4,015,812 issued Apr. 5, 1977 to M. Heesch.

In the cited patent, a multiple shaft motor is used to generate the three adjustments, fore and aft, front end vertical and rear end vertical. Each motor shaft drives a gear train within a respective gear box to rotate a lead screw. Each lead screw mates with its own drive block. For the fore and aft drive, rotation of the fore and aft lead screw causes relative translatory movement between the drive block and the gear box. Since one (block or gear box) is affixed to the stationary seat track and the other to the movable track, translation of the movable seat track in the fore and aft direction results from rotation of the fore and aft lead screw. For vertical adjustment, the respective drive blocks are each secured to one bracket arm of a bell crank, the other end of each bell crank being secured to the respective end of the seat to control the elevation thereof.

In this structure, each drive block is pinned on both sides to the bracket members, the pins entering the drive block for a short distance to prevent interference with the mating lead screw. Since all the driving forces must be transferred from lead screw to drive block, and from the drive block mounting to the adjacent bracket, the pin connection members must withstand the mechanism driving forces.

For this reason, the rivets or pins are serrated for press fit relationship with the adjacent bracket member. The pins must act to hold the bracket member from spreading outwardly since the brackets are essentially U-shaped with the drive block supporting members being the legs or sides of the U. Such brackets have a tendency to spread when shock loading is applied and the pins must act to lessen this tendency of the bracket legs to spread.

For the same reason, the pins must be secured within their block and must be secured to the adjacent bracket. The assembly of the pins to the drive blocks and the drive blocks to the seat track therefore becomes an expensive and complex operation.

Generally stated, the drive block or nut is used to position the upper track of an automotive power seat track assembly relative to the lower track via the drive screw's rotary motion in the nut. Space requirements dictate a "U" shaped bracket to keep the nut from rotating which limits the strength of the assembly. Pins have been inserted in the bracket and nut as one means of holding the nut in position. Screws have also been used for this purpose.

Actual strength of the pinned nut assembly is widely variable since if the pin is inserted in the nut too far, destructive forces are induced in the nut which contribute to its failure. If the pin is not in far enough, the holding power of the pin is reduced. The screw-nut assembly has a similar problem in that the assembly is weakened if the screw threads are partially stripped due to overtightening. Undertightening results in a weaker assembly due to decreased thread engagement. All of these assembly conditions are subject to day to day assembly variations.

When the nut-bracket assembly is subjected to the large forces that are required of seat tracks for safety reasons, the "U" shaped bracket opens; and in the case of the pins, disengages the pins from either the nut or the bracket and frees the seat. When screws are threaded into the nut to hold the "U" shaped section together, the forces are of such a magnitude as to shear the threads in the nut material. Increasing the screw thread engagement is prohibited because the space allowed for the nut-bracket assembly is minimal. Economic and weight considerations do not allow additional nut or bracket material to be added.

SUMMARY OF THE INVENTION

The present invention is directed to an improved drive control arrangement for an adjustable seat track mechanism. In the drive arrangement of the present invention, the drive block mounting brackets are C-shaped brackets mounted on one of the seat track rails with two bracket members spaced to receive the drive block. The bracket members have slots in respective facing legs, with each slot having a narrow vertical extent terminating in a circular opening of diameter greater than the width of the slot.

The drive block which may be molded has integral mounting lugs extending outwardly on both sides. The lugs have opposed flats on the neck portions, the across-the-flats dimension being sized to pass through the vertical extent of the slot of a bracket. The lugs have enlarged heads for engaging the bracket outer wall and thereby prevent spreading of the bracket members or legs. The neck portion of each lug is adapted to pass through the narrow slot into the circular opening. Within the opening, the block is rotated 90° and larger cylindrical segments on the sides of the neck portion hold the block within the brackets. The cylindrical segments form enlargements in the neck portions acting to resist shear forces applied to the block during adjustments and during the application of shock loading.

It is therefore an object of the invention to provide an improved construction for an adjustable seat track.

It is a further object of the invention to provide a seat track adjustment mechanism using a readily assembled drive control.

It is a further object of the invention to provide a lead screw drive for an adjustable seat track, the drive acting on a drive block readily insertable into a block holder bracket to be held therein and prevent spreading of the drive block holder during shock conditions.

It is still further object of the invention to provide an improved drive block and holder for an adjustable seat track in which the drive block has integral mounting members for ready joinder to the block holder.

BRIEF DESCRIPTION OF THE DRAWINGS

FIG. 3 is an end view of the mechanism of FIG. 1;

FIG. 4 is a side view in elevation of the block holder as shown in FIGS. 1-3;

FIG. 5 is an end view of the holder of FIG. 4;

FIG. 6 is a side view in elevation of the holder of FIGS. 4 and 5 viewed from the side opposing that viewed in FIG. 4;

FIG. 7 is a front view of the drive block shown in FIGS. 1-3;

FIG. 8 is a plan view of the block of FIG. 7; and

FIG. 9 is a side view of the block of FIG. 7.

DETAILED DESCRIPTION OF THE DRAWINGS

Figure 1:
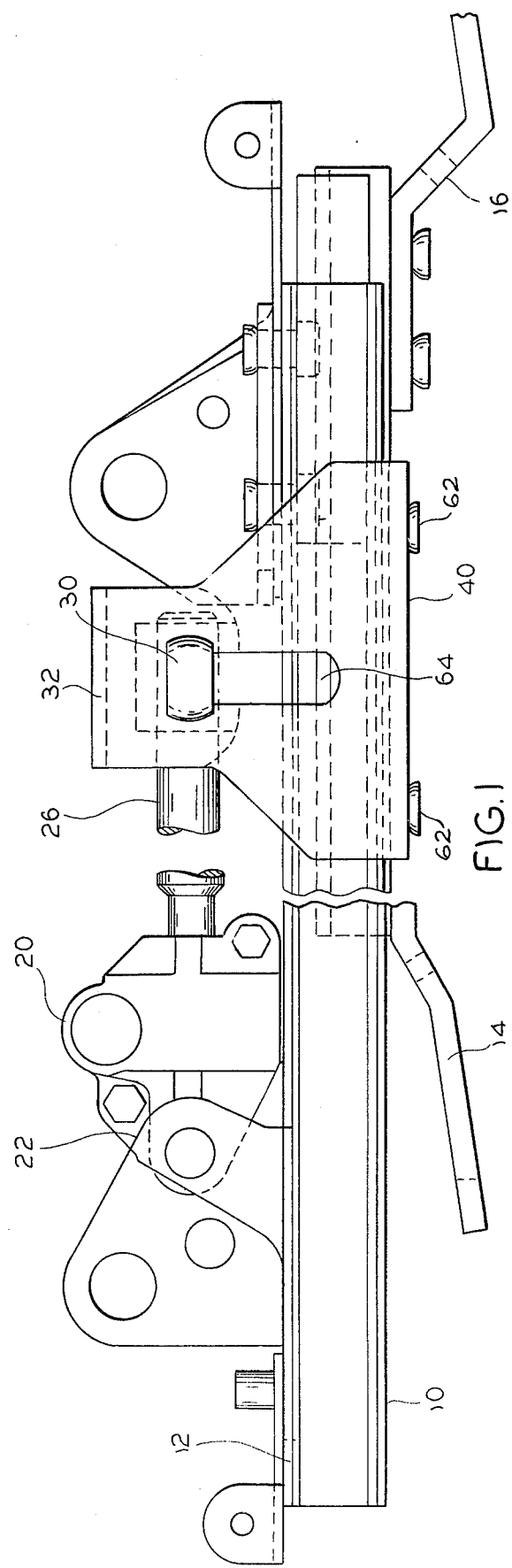
FIG. 1 is a side elevation of a seat track mechanism partially broken away using my invention.

In FIG. 1, I show a seat track mechanism of generally known configuration. For purposes of simplifying the disclosure, the specifics of the drive for the front and rear end elevating mechanisms have been omitted from FIGS. 1 and 2, as not being necessary to the disclosure of the invention in the form shown.

Figure 2:
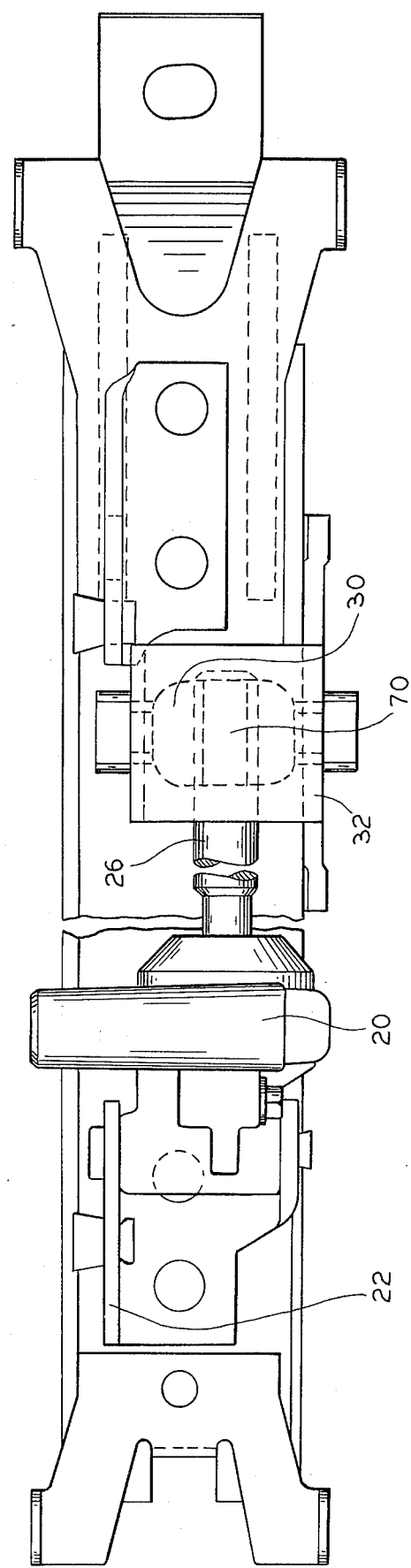
FIG. 2 is a plan view in elevation of the track mechanism of FIG. 1.

In FIGS. 1-3, there can be seen the lower track 10, the upper track 12, the tracks are both essentially U-shaped with the upper track inverted to fit over the lower track with suitable conventional glide members forming the slide tracking of mechanism. The tracks are interleaved as shown in FIG. 3 for mutual tracking action. As is conventional, the lower track has angled beams 14 and 16 extending downwardly for mounting on a suitable surface such as the vehicle floor (not shown). Thus, the lower track is stationary. The seat and seat frame (not shown) are mounted on and held by the upper track in any conventional manner.

For providing horizontal or fore and aft movement, there is provided a gear box 20 with transverse opening for conventional motor shaft or bourdon wire (not shown). The gear box 20 is mounted on the upper track 12 by angle bar 22 suitably riveted to the track. A gear box such as box 20 is shown in detail in U.S. Pat. No. 3,951,004 issued to M. Heesch on Apr. 20, 1976. In that patent is shown a lead screw extending from the gear box for mating with a threaded steel block. In FIGS. 1-3, I show a lead screw 26 extending horizontally from gear box 20 to fit within a threaded drive block 30 so that the lead screw can be rotated in response to operation of a drive motor in the manner shown and described in the cited references to advance and retract the lead screw relative to the drive block 30.

Spaced a longitudinal distance from the gear box is a block-mounting bracket 32 suitably riveted or otherwise securely affixed to the lower track 10 on its bottom web surface 34.

Bracket 32 is shown in detail in FIGS. 4-6. The bracket 32 has a flat lower member 40 which is the base of its C-shaped structure. Angled from the base 40 is an upstanding support side bar 42 which supports and mounts the upper channel section 44. The channel section is formed of two vertical, parallel side bars 50 and 52 joined by the top horizontal web 54. The one side bar 50 is an extension of the side member 42, while the other side bar 52 terminates a distance above the base to provide a gap 56 between the base 40 and the remote side bar 52.

Two aligned mounting holes 60 are formed or pierced through the base 40 to accept the rivets 62 for mounting on the lower track.

The opposed side bars or members of the bracket are slotted with a narrow vertical extent 64 of the slot in each side bar terminating at its upper end in a circular opening 66, each opening having its diameter greater than the width of the slot with which it is in communication. The slot in the remote side bar 52 is open at the bottom for reasons which will be explained. This open-bottomed slot is narrower in width than the slot in bar 50 to aid in the assembly of the block in the proper orientation with the chamfered end of the threaded opening facing the lead screw.

In the assembly of FIGS. 1-3, a drive block 70 is shown mounted in the circular openings 66 of the opposed side bars 50 and 52. In FIGS. 4 and 5, I have shown the drive block 30 in dashed form, the drive block being shown in detail in FIGS. 7-9.

The drive block 30 has a main body 70 essentially rectangular in section with rounded corners, and a threaded bore 72 extending through it. The bore is sized to matingly receive the lead screw 26 in driving relation. At the transverse sides of the body 72 (as viewed in FIGS. 7 and 8), the block has opposed side mounting lugs 74. The lugs each have a necked portion 76 adjacent the body 72, the necked portion leading to an enlarged headed portion 78 at the outer end of each such lug. Both necked portion and head portions have cylindrical wall segments 80 and 82, respectively, with opposed flats 86 separating the segments, the edge of the flats being at the same distance from the centerline 88 for both the necked portion and headed portion. As can be seen best in FIG. 8, the lug on the left side is smaller than that of the right side to aid in the mounting of the block in the bracket 32.

To mount a drive block assembly to the seat track, the bracket is first secured to the seat track by the rivets 62 or other suitable fasteners in the position of FIGS. 1-3. The drive block is inserted from the remote side into gap 56 with the cylindrical segments directed vertically and the edges of the flats directed horizontally. One lug is inserted into the narrow portion 64 of the slot of the extension side bar 50 such that the neck engages the slot. The drive block is raised with both lugs in registry with the respective slots. When the lugs are resting in the circular openings 66, the drive block is rotated by 90° to position the threaded bore 72 of the block in engagement with the lead screw. The lead screw is rotated to engage the threads of the bore with the lead screw and advance the upper track relative to the lower track.

In the position of FIG. 1, with the drive block in engagement with the lead screw, the cylindrical segments of both the head and neck form the horizontal dimension of the block, while one flatt side rests on the lower portion of the cylindrical opening, and is held thereby.

The cylindrical segments have a diameter greater than the width of the slots 64, thus, the drive block cannot fall out of engagement with the circular openings 66. The segments having a greater length in the horizontal direction to provide a greater resistance to shearing forces on the lug.

The headed portion of the lugs rest outside the side bars 50 and 52 and the shoulders forming the headed portion will resist the tendency of the side bars to spread under shock loading.

I have found that a drive block of glass filled nylon molded with integral lugs provided the necessary resistance to shear in its engagement with the bracket side bars and resistance to axial forces along the axis of the lead screw. In addition, this material provides a lead screw receiving bore with threads which do not easily strip during normal operation of the adjusting mechanism or by shock loading thereon.

I claim:

1. In an adjusting mechanism for a vehicle seat track having a lower track adapted to be secured stationarily to a vehicle and an upper track movable relative to said lower track to provide adjustable movement between a seat and said vehicle, and in which there is a lead screw mated with a drive block for controlling relative movement of the upper track relative to the lower track in response to rotation of the screw in the drive block, in which there is a drive block holding mechanism affixed to one track and with lead screw rotating means coupled to the other track, the invention in which the block holding mechanism has a pair of transversely spaced, opposed brackets with a slot in each bracket in alignment with one another, each of said slots having an opening, and comprising a drive block with its body extending between said brackets, said drive block including mounting lugs resting in said openings and extending therethrough, and each mounting lug including a head externally of the bracket with each head periphery greater than the size of the bracket opening thereby to hold the drive block firmly between said brackets.

2. In a mechanism as claimed in claim 1, in which the openings in said brackets are circular and of greater diameter than the width of the entry portions of the respective slots, and with each of said lugs having a neck between the block body and head of the lug, said neck having opposed flat walls passable through the entry portion of the bracket slots and said lugs including expanded annular walls of greater diameter than the flatted walls, said annular walls adapted to adjoin the circular opens of said brackets.

3. In a mechanism as claimed in claim 2 in said drive block body and lugs comprise an integrally molded unitary member with a threaded opening in the block body midway between the lugs, the threaded opening adapted to receive the lead screw.

4. In a mechanism as claimed in claim 3, in which the drive block is fabricated of glass filled nylon material.

5. Mounting structure for receiving a seat rack adjustment controlling lead screw, said mounting member including a drive block with a central threaded bore for receiving said lead screw in driving relation therewith, said block including a pair of oppositely extending mounting lugs, a channel bracket with opposed walls having slotted openings receptive of said lugs to hold said block between the channel walls of said bracket, each of said lugs being headed at the terminal ends thereof externally of the channel walls to hold the walls against separation, and entry passages leading into said slotted openings to enable entry of the lugs into the openings.

6. A mounting structure as claimed in claim 5, in which said entry passages are narrower in width than the width of the lug-holding openings, and said lugs have neck walls sized to fit through said entry passages and enlarged segments for holding said lugs in said openings.

7. A mounting structure as claimed in claim 6, in which said channel bracket includes a continuation of one of the channel walls with a bracket mounting base and the other terminates with a gap between the base and the other channel wall and said entry passage in said other channel wall is open to said gap.

8. A mounting structure as claimed in claim 6, which the neck walls of said lugs have partial segments greater in diameter than the width of said entry passages and flat wall areas lesser in extent than the width of said entry passages.

* * * * *